United States Patent [19]
Gauthier et al.

[11] Patent Number: 6,151,307
[45] Date of Patent: Nov. 21, 2000

[54] FIBRE INK SUPERFRAME FORMAT

[75] Inventors: John A. Gauthier, Kanata; David Okura, Nepean, both of Canada

[73] Assignee: Nortel Networks Corporation, Montreal, Canada

[21] Appl. No.: 08/957,010

[22] Filed: Oct. 23, 1997

[51] Int. Cl.[7] .............................. H04L 12/26; H04L 7/00; H04J 3/16

[52] U.S. Cl. ..................... 370/248; 370/466; 370/472; 370/907; 375/368

[58] Field of Search .................................... 370/466, 470, 370/248, 472, 476, 907, 510, 513, 242, 243, 522, 524, 537, 538, 539; 375/368

[56] References Cited

U.S. PATENT DOCUMENTS

| | | | |
|---|---|---|---|
| 4,768,192 | 8/1988 | Pattavina et al. | 370/466 |
| 4,943,958 | 7/1990 | Young et al. | 370/466 |
| 5,060,229 | 10/1991 | Tyrrell et al. | 370/522 |
| 5,513,173 | 4/1996 | Machemer et al. | 370/252 |
| 5,784,377 | 7/1998 | Baydar et al. | 370/463 |
| 5,790,531 | 8/1998 | Ellebracht et al. | 370/242 |

OTHER PUBLICATIONS

T10105–1995 American National Standard for Telecommunications—Synchronous Optical Network (Sonet) Basic Decription including Multiplex Structure, Rates, and Formats.

*Primary Examiner*—Alpus H. Hsu
*Assistant Examiner*—Afsar M. Qureshi

[57] ABSTRACT

A serial optical link for transmission of payload data is utilised so as to permit transmission of information facility data unrelated to the payload data. A superframe is constructed at the transmission facility made up of a serial series of data frames. Each data frame consists of serially arranged words including a number of payload data words and a non-payload word. One non-payload word of the superframe has information facility data which provides a communication channel from the transmitting facility to the receiving facility for information unrelated to the communication of payload data. Another non-payload word has alarm and status facility data. The information facility data is stored in a FIFO buffer when received. If the FIFO buffer is within two words of being full, a full signal is incorporated in the next alarm and status facility data word which causes the receiving end to suspend sending information facility data words.

12 Claims, 4 Drawing Sheets

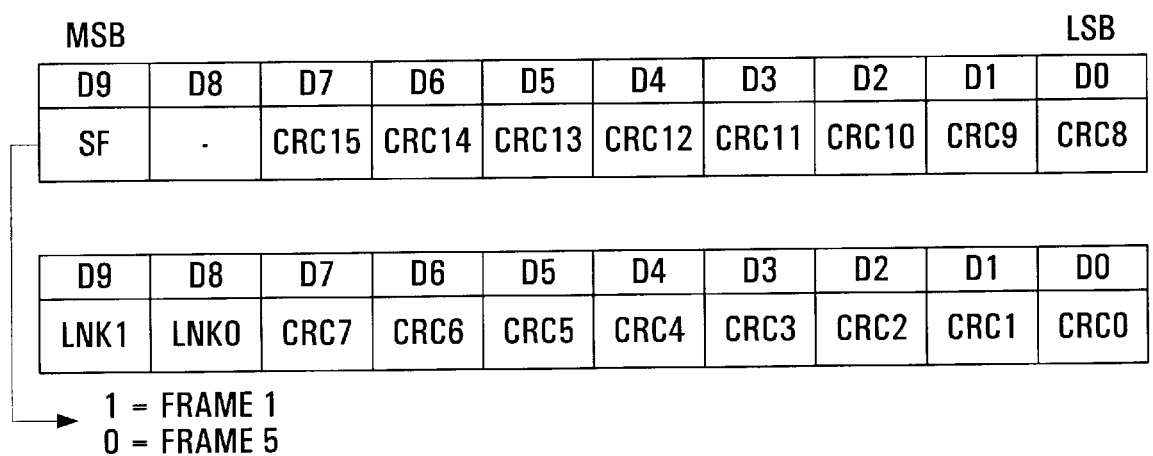

FIBRE INK SUPERFRAME FORMAT

FIELD OF THE INVENTION

This invention relates to a method for communicating data from a transmission facility to a receiving facility over a serial link and to a communication system for utilising a pair of serial links.

BACKGROUND OF THE INVENTION

Optical fibre cables provide high speed serial data links. DS-512 is a known protocol for sending data over an optical fibre cable. According to this protocol, transmissions comprise frames of data, each frame consisting of 512 words. Each word is a ten bit payload word which is expanded to twelve bits prior to transmission in order to embed clock information in the word for extraction by the receiver. Words of like rank in each frame (e.g., the fifty-fourth word in each frame) comprise data from one channel (e.g., one telephone connection). The first word of each frame (i.e., channel 0) is a framing word. The framing word comprises a set pattern, which in the standard for 12 bit code is unique and is the hexadecimal number "782". A receiver uses the framing word to ensure it stays in synchronisation with the transmitter during a transmission.

In the case of an alarm situation (e.g., a loss of synchronisation or a failure of one of the transmitter or receiver), the transmitting end may flood the channel data with specific codes, overwriting the payload data words of the channels.

Typically, two fibres provide a single DS-512 link with each fibre providing a data path in one direction; this allows for the facilities connected to each end of the cable to act as both transmitter and receiver simultaneously.

This invention seeks to provide an improved manner of utilising a serial link, which link may be a DS-512 link.

SUMMARY OF THE INVENTION

According to the present invention, there is provided a method for communicating data from a transmission facility to a receiving facility over a serial link, comprising the steps of: constructing, at said transmission facility, a superframe comprising a serial series of data frames, each data frame having a serial plurality of words comprising a plurality of payload data words and a non-payload word; a non-payload word for two of said frames of said superframe comprising a facility data word, one of said facility data words providing facility alarm and status data and another of said facility data words providing facility data unrelated to the communication of payload data.

According to another aspect of the present invention, there is provided a link controller for a transceiver facility connected between a serial link and a source, comprising: (i) a receiver for receiving payload data from said source; (ii) a superframe constructor for constructing superframes which include said payload data for transmission over said serial link to another transceiver facility, each superframe comprising a serial series of data frames, each data frame having a serial series of words comprising a plurality of payload data words and a non-payload word; a non-payload word for one of said frames of said each superframe comprising facility data providing facility information for said other transceiver facility unrelated to the communication of payload data, a non-payload word for another of said frames of said each superframe comprising alarm and status facility data; (iii) a transmitter for sending superframes to said other transceiver over said serial link; (iv) a receiver for receiving superframes over said serial link from said other transceiver; (v) a detector for detecting a received information facility data word in each received superframe; and (vi) a FIFO buffer for temporarily storing detected received information facility data words until they are read by a processor of said transceiver facility; and (vii) a signaller for sending a full indication to said other transceiver in a next constructed alarm and status facility data word when said FIFO buffer is within a pre-set number of words of being full.

DESCRIPTION OF THE DRAWINGS

In the drawings which illustrate example embodiments of the invention,

FIG. 4 is a schematic superframe organisational diagram, FIG. 5 details a portion of FIG. 4, FIG. 6 details a portion of FIG. 4, and FIG. 7 details a portion of FIG. 4.

DESCRIPTION OF THE PREFERRED EMBODIMENTS

Figure 1:
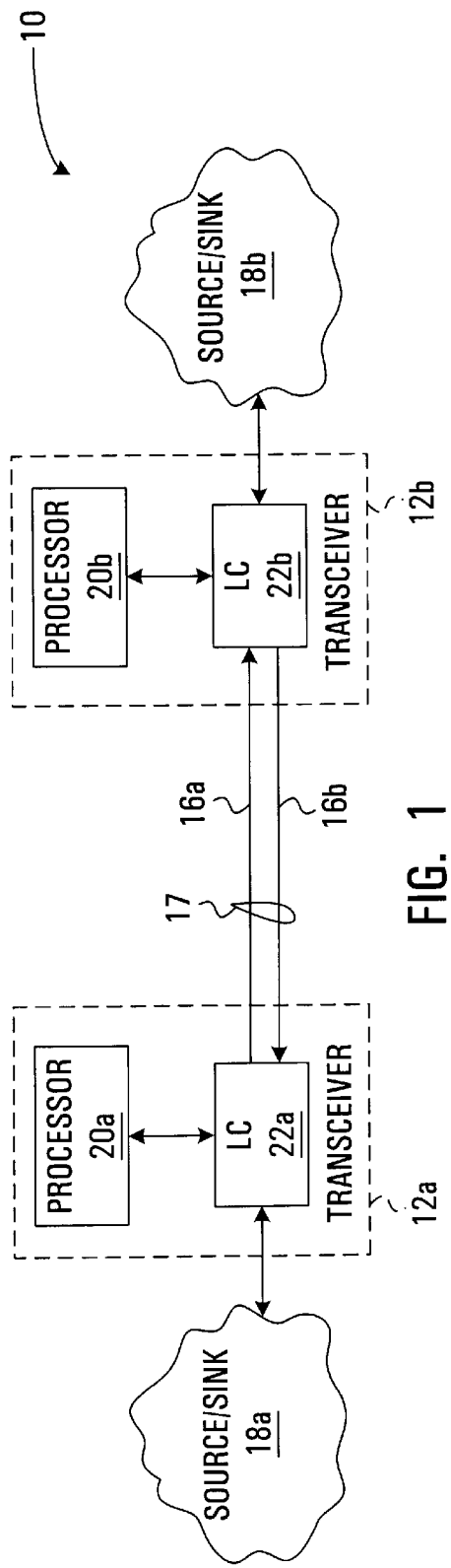
FIG. 1 is a schematic diagram of a communication system for utilising a pair of serial links.

Turning to FIG. 1, a communication system generally illustrated at 10 comprises a first transceiver facility 12a and a second transceiver facility 12b linked by a link 17 which comprises a pair of optical fibres 16a, 16b. Fibre 16a is for sending data from facility 12a to 12b and fibre 16b is for sending data from facility 12b to 12a. Facility 12a is connected to a data source/sink 18a, and facility 12b is connected to a data source/sink 18b. Each transceiver 12a, 12b comprises a processor 20a, 20b which is connected for two-way communication with a link controller (LC) 22a, 22b. It is the LC of the facility which is connected between the link 17 and the data source/sink 18a, 18b.

Figure 2:
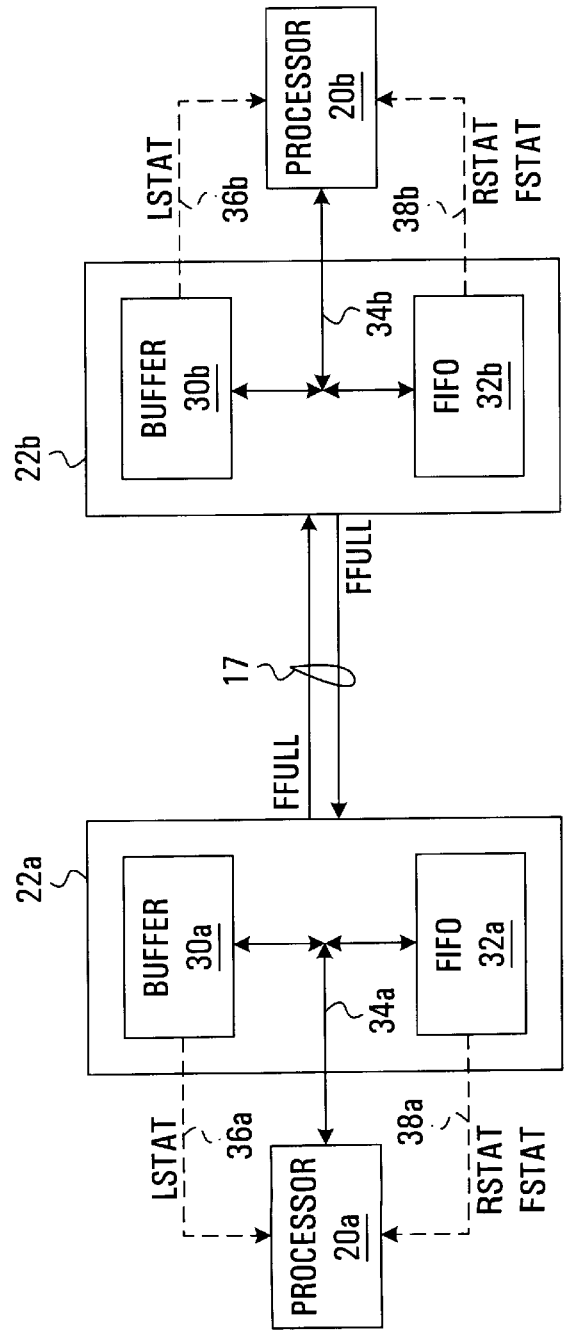
FIG. 2 is a detail view of a portion of FIG. 1.

Turning to FIG. 2, which details a portion of FIG. 1, each LC 22a, 22b includes a two word transmit buffer 30a, 30b and an eight word first-in-first-out (FIFO) receive buffer 32a, 32b. The transmit buffer receives words from the processor on bus 34a, 34b. Each FIFO receive buffer 32a, 32b sends words to its processor 20a, 20b on bus 34a, 34b. As will be explained hereinafter, the transmit buffer holds information facility data words for transmission and the FIFO receive buffer holds received information facility data words for passing to the processor 20a, 20b at the receiving end.

Figure 3:
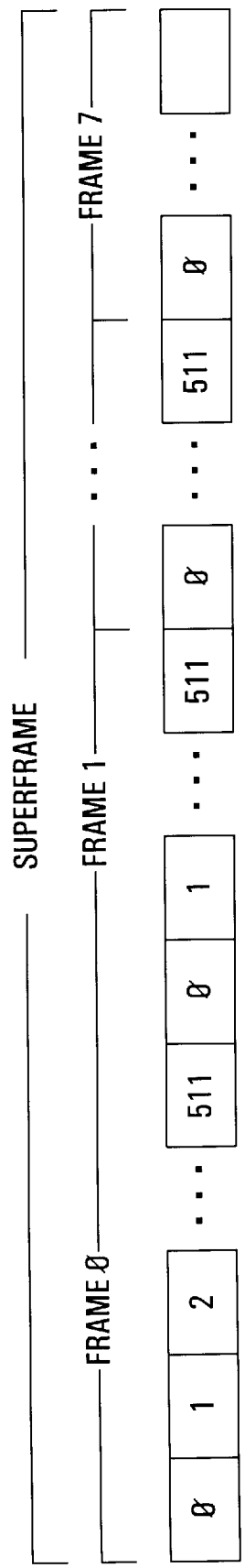
FIG. 3 is a schematic data flow diagram.

When an LC 22a, 22b of a facility 12a, 12b receives data from the data source/sink 18a, 18b to which it is connected, it organises the data into superframes for transmission over a serial link 17. More particularly, each current communication channel established between the data source/sink and the LC has, or is given, a channel number between 1 and 511. Turning to FIG. 3, received data words are organised serially into consecutive frames, with words from channel 1 allocated to rank 1 in each frame, words from channel 2 allocated rank 2 in each frame, and so on up to words from channel 511, which are allocated to the final rank of the frame. Consequently, there is one word per channel accommodated in each frame. The data words received from the data source/sink may be described as payload data words since they comprise words which are for communication between remote stations. As explained more fully hereinafter, the zeroth rank of each frame is reserved for a non-payload word.

As seen from FIG. 3, a superframe comprises eight frames (numbered 0 to 7) organised as aforedescribed. Once a superframe is constructed, the LC may begin constructing a subsequent superframe. As data words are passed to the LC, organised into frames and frames into superframes, they are transmitted over the link to the far end. In the LC, the ten bit words are converted to twelve bit words to embed clock information, in a known fashion, prior to transmission.

FIG. 4 illustrates the nature of the non-payload words of rank 0 in each frame. Turning to FIG. 4, it will be noted that frames number 0 and 4 have a frame word in rank 0. As with standard DS-512 links, the framing word comprises a set pattern, namely, the hexadecimal number "782". These framing words are used by the receiving facility to assist it in staying in synchronisation with the transmitting facility. It has been recognised that a framing word every four frames is sufficient to maintain synchronisation at the receiving end.

Frames number 1, 2, 5, and 6 have error checking words. These are preferably cycle redundancy check (CRC) words illustrated in FIG. 5. The CRC words from consecutive frames (1 and 2 or 5 and 6) make up a sixteen bit word (CRC0 to CRC15) which is sufficient to check for errors over four frames given 512 words per frame and twelve bits per word. The mechanics of CRC checking are well understood to those skilled in the art and, therefore, not further detailed.

From FIG. 5, it will be noted that the non-payload word of frames 1 and 5 has an "SF" bit which is used to provide superframe alignment at the receiving end. When the SF bit is detected at a 1, then it indicates that the current frame is frame 1; at a 0, it indicates frame 5.

The preferred embodiment can accommodate four two-way serial links, between facilities 12a, 12b (with each link comprising two fibres, one for each direction). Each link is separate in operation. With four links, the LNK1 and LNK2 bits of frames 2 and 6 indicate to which of the far end group of four links the far end is connected—this assists the processor confirm that the far end is correctly connected.

Figure 6:
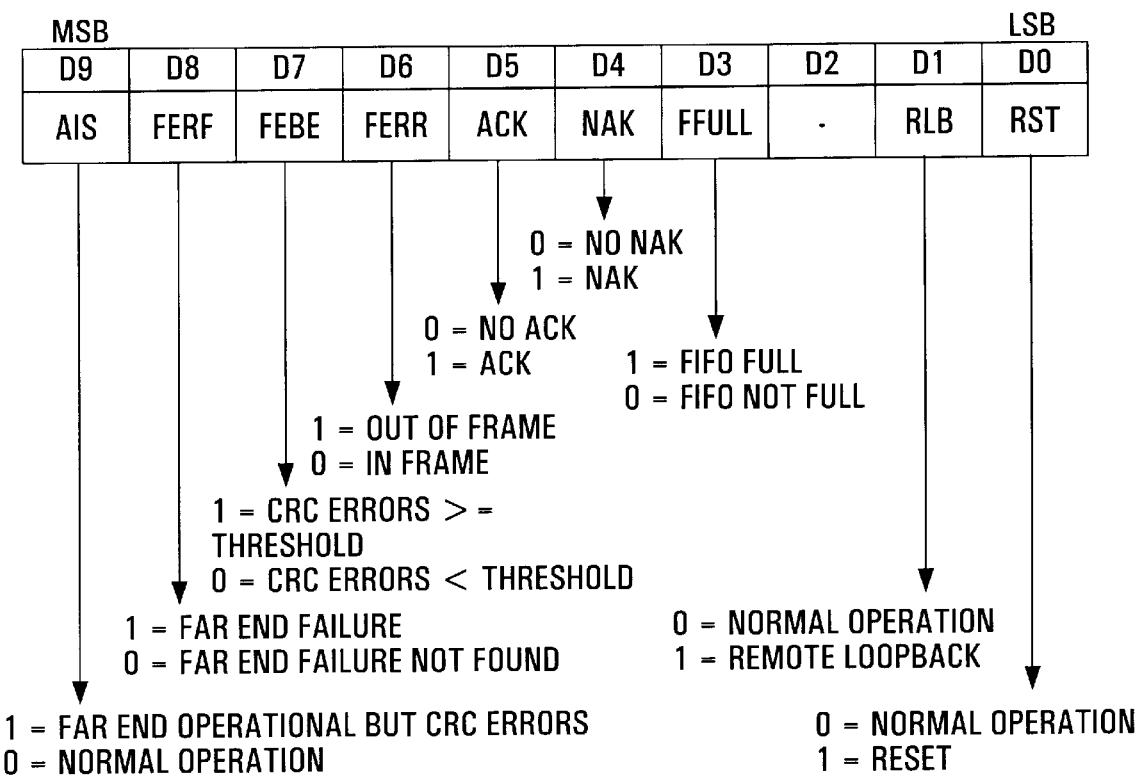

Communication of alarm and status facility data between facilities is provided by the non-payload word of frame 3. Turning to FIG. 6, this word is seen to compromise bits to indicate the following:

the far end is operational but has CRC errors (AIS);

the far end has apparently failed (FERF);

the far end has CRC errors present beyond the acceptable threshold (FEBE);

the far end (i.e., the facility sending this word) is out of frame (i.e., it has lost synchronisation) (FERR);

acknowledgement by the far end of receipt of an earlier message from the near end (ACK);

positive acknowledgement by the far end of non-receipt of a message from the near end (this generally results in the far end sending the message again) (NAK);

the far end FIFO buffer (32a, 32b—FIG. 2) is within two words of being full (FFULL);

the near end is instructed to loop data from the far end back to the far end (used to test a data link) (RLB); and the near end is instructed to perform a reset (RST).

Figure 7:
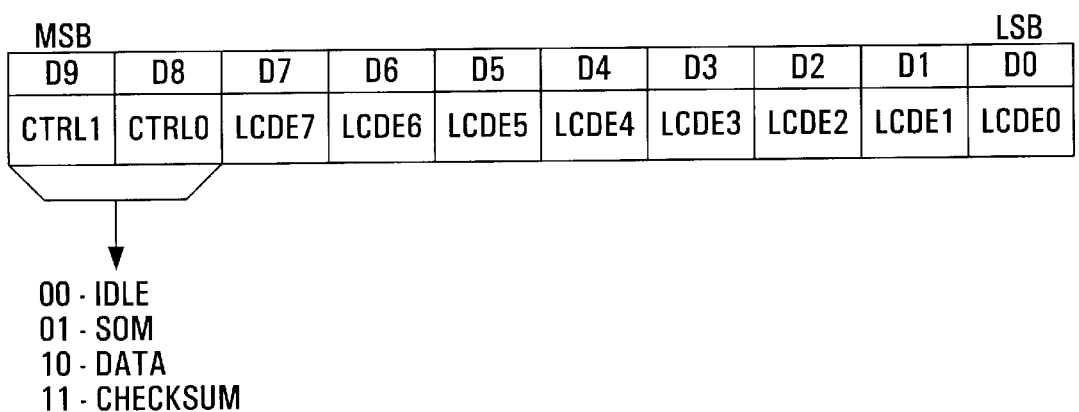

Frame 7 comprises an information facility data word which provides a communication channel between the two receivers for purposes which may be unrelated to the transfer of payload data between the transceivers. Turning to FIG. 7, the information facility data word comprises two control bits to indicate whether the facility data word is idle, has data, or comprises an error checking word. The remaining bits are data bits. These data bits may, for example, identify the near end facility, query an identification of the far end facility, or provide any messaging function as deemed necessary between the processors of the two facilities at the two ends of the link.

While there is a consistent amount of overall error checking, synchronisation, and alarm and status data relating to the sending of the payload data for each superframe, the amount of information facility data will vary as the near end may, at times, have little to communicate to the far end and at other times, it may have a great deal to communicate. Referencing FIG. 2, the transmit buffer 30a, 30b of an LC 22a, 22b, temporarily stores information facility data words generated by the associated processor of the near end until the LC 22a, 22b has a superframe available for such words. If the buffer becomes full, the LC indicates this condition on line 36a, 36b to its associated processor 20a, 20b by sending an LSTAT signal on this line so that the processor will stop sending information facility data words until there is again room to accommodate same. On the other hand, if the transmit buffer is empty, the LC will construct a superframe with a information facility data word having control bits indicating an idle condition.

When a superframe is received at the far end, the far end LC detects the information facility data word and stores it in its FIFO receive buffer 32a, 32b. If the far end processor has available processor time, it reads and analyses the first word in queue of the FIFO buffer. At any given time, however, the far end processor may be busy; in such case, words build up in the FIFO buffer. If the FIFO receive buffer becomes within two words of full, it generates a full signal internally in the LC. The LC responds to the full signal by sending a set FFULL bit in the next alarm and status facility data word (the LC also sends an FSTAT signal on line 38a, 38b indicating the two words from full condition to the far end processor in order to prompt the processor to prioritise reading of facility data words). Since the FFULL bit is part of the alarm and status facility data word, it is not queued in the near end FIFO receive buffer when it is received over link 17 but is passed directly to the near end processor. This full indication is seen by the near end processor as a positive RSTAT signal on line 38a, 38b from the LC (i.e., the LC at the near end renames the incoming set FFULL bit as RSTAT). When the near end processor receives the RSTAT signal, it is prompted to suspend generating information facility data words. At the time of receiving the indication the far end FIFO buffer is full, there may be as many as two words in the near end transmit buffer. This is not problematic since the FFULL bit is set when there is still room at the far end to accommodate two additional words. Once the far end FIFO buffer is emptied below two words of full, it ceases to generate a full signal internally in the far end LC. This causes the far end LC to generate a reset FFULL bit in the next alarm and status facility data word which results in a zero RSTAT indication at the near end processor freeing the near end processor to again transmit information facility data words. This operation proceeds similarly in both directions on the link.

Even when a processor does not generate information facility data words, idle words are sent in rank 0 of frame 7 of the superframe. The LC at the receiving end analyses the control bits of information facility data words and discards those which indicate an idle word rather than placing such words in the FIFO buffer. This avoids problems when the FIFO buffer is full. This arrangement provides flow control for general communications between the two transceivers which allows an immediate response at the link controller level to potential overload situations.

While the transmit buffer of a facility has been described as accommodating two information facility data words, it may accommodate any number, provided this number is no greater than the number shy of full which will cause a full indication from the FIFO buffer of the facility at the other end of the link.

Each FIFO buffer is preferably implemented as a hardware buffer in the link controller.

The described system and method of utilising a serial link, while preferably employed with an optical link, may have application to other links as well.

Modifications will be apparent to those skilled in the art and, therefore, the invention is defined in the claims.

What is claimed is:

1. A method for communicating data between first and second transceiver facilities over a serial link, comprising, at said first transceiver facility;
    receiving, from said second transceiver facility, a first superframe comprising a serial series of data frames, each data frame having a serial plurality of words comprising a plurality of payload data words and a non-payload word;
    a non-payload word for two of said frames of said first superframe comprising a facility data word, a first one of said facility data words providing a facility alarm and status data and a second one of said facility data words providing facility data unrelated to the communication of payload data;
    at least where said second facility data word is not a word indicating an idle condition, queuing said second facility data word on a FIFO buffer;
    where said FIFO buffer is within a pre-set number of words of being full, constructing an alarm and status facility data word with an indicator indicating said FIFO buffer is full;
    constructing another facility data word having facility data unrelated to the communication of payload data;
    constructing, at said first transceiver facility, a second superframe comprising a serial series of data frames, each data frame having a serial plurality of words comprising a plurality of payload data words and a non-payload word;
    one non-payload word comprising said alarm and facility data word with said full indicator and another non-payload word comprising a facility data word having facility data unrelated to the communication of payload data; and
    sending said second superframe to said second transceiver.

2. The method of claim 1 further comprising retrieving and analyzing each said facility data word unrelated to the communication of payload data queued on said FIFO buffer on a FIFO basis.

3. The method of claim 2 wherein each superframe is constructed such that each frame has a non-payload word at a rank in the frame which is the same as a rank for a non-payload word in each other frame.

4. The method of claim 3 wherein each superframe is constructed such that:
    a non-payload word for at least one of said frames of said superframe comprises error detection data; and
    a non-payload word for at least one of said frames of said superframe comprises synchronization data.

5. The method of communicating data between a first transceiver facility and a second transceiver facility over a serial link, comprising:
    constructing, at said first transceiver facility, a first superframe comprising a serial series of data frames, each data frame having a serial series of words comprising a plurality of payload data words and a non-payload word; a non-payload word for one of said frames of said first superframe comprising information facility data providing information from said first transceiver facility for said second transceiver facility unrelated to communication of payload data; a non-payload word for another of said frames of said first superframe comprising alarm and status facility data providing facility alarm and status data;
    sending said first superframe to said second transceiver;
    at said second transceiver, receiving said first superframe, detecting said first transceiver information facility data word and said first transceiver alarm and status facility data word, temporarily storing said first transceiver information facility data word and subsequently received first transceiver information facility data words in a buffer, analyzing each said first transceiver information facility data word on a FIFO basis, constructing a second transceiver information facility data word at least partly in response to said first transceiver information facility data word and a second transceiver alarm and status facility data word, monitoring the capacity of said buffer and, where said buffer is substantially full, including a full buffer indication in said second transceiver status and alarm facility data word and constructing a second superframe comprising a serial series of data frames, each data frame having a serial series of words comprising a plurality of payload data words and a non-payload word; one non-payload word for one of said frames of said second superframe comprising a second transceiver information facility data word and another non-payload word for one of said frames of said second superframe comprising said second transceiver alarm and status facility data word; and
    sending said second superframe to said first transceiver.

6. A link controller for a transceiver facility connected between a serial link and a source, comprising:
    (i) a receiver for receiving payload data from said source;
    (ii) a superframe constructor for constructing superframes which include said payload data for transmission over said serial link to another transceiver facility, each superframe comprising a serial series of data frames, each data frame having a serial series of words comprising a plurality of payload data words and a non-payload word; a non-payload word for one of said frames of said each superframe comprising facility data providing facility information for said another transceiver facility unrelated to the communication of payload data, a non-payload word for another of said frames of said each superframe comprising alarm and status facility data;
    (iii) a transmitter for sending superframes to said another transceiver over said serial link;
    (iv) a receiver for receiving superframes over said serial link from said another transceiver;
    (v) a detector for detecting a received information facility data word in each received superframe; and
    (vi) a FIFO buffer for temporarily storing detected received information facility data words until they are read by a processor of said transceiver facility; and (vii) a signaller for sending a full indication to said another transceiver in a next constructed alarm and status facility data word when said FIFO buffer is within a pre-set number of words of being full.

7. The transceiver of claim 6 including a transmit buffer for storing a number of information facility data words destined for said another transceiver, said transmit buffer having a capacity no greater than said pre-set number of words.

8. The transceiver of claim 6 wherein said FIFO buffer is a hardware buffer.

9. The method of claim 4 further comprising queuing said another facility data word on a transmit buffer having a length equal to that of said FIFO buffer less said pre-set number of words.

10. The method of claim 9 wherein said constructing said second superframe comprises obtaining said another non-payload word from a head of said transmit buffer.

11. The method of claim 10 further comprising signalling at said first transceiver when said transmit buffer is full in order to suspend said step of constructing another facility data word having facility data unrelated to the communication of payload data.

12. The method of claim 11 wherein, when said second facility data word is an idle word, not queuing said second facility data word on said FIFO buffer.

* * * * *

UNITED STATES PATENT AND TRADEMARK OFFICE
CERTIFICATE OF CORRECTION

PATENT NO. : 6,151,307
DATED : November 21, 2000
INVENTOR(S) : John A. Gauthier et al.

It is certified that error appears in the above-identified patent and that said Letters Patent is hereby corrected as shown below:

Title Page:
Field [54]:delete "FIBRE INK SUPERFRAME FORMAT" and insert --FIBRE LINK SUPERFRAME FORMAT--

Column 5,
Line 20, delete "facility;" and insert -- facility: --
Line 28, delete "providing a facility" and insert -- providing facility --

Column 6,
Line 1, delete "The method" and insert --A method --

Signed and Sealed this

Twenty-fourth Day of July, 2001

Attest:

Nicholas P. Godici

NICHOLAS P. GODICI
*Attesting Officer*    *Acting Director of the United States Patent and Trademark Office*